Patented June 17, 1952

2,601,176

UNITED STATES PATENT OFFICE 2,601,176

CAPACITANCE TYPE LIQUID QUANTITY GAUGE

Stanley James Smith, Ossining, N. Y.

Application January 26, 1949, Serial No. 72,913

3 Claims. (Cl. 73—304)

This invention relates to liquid quantity gauges of the kind in which the electrodes of a capacitance are arranged within the container for the liquid in such manner that as the quantity of liquid in the container changes the proportion of air to liquid as the dielectric of the capacitor and hence its capacitance changes.

As is now well known such capacitor type gauges may be arranged merely to indicate the level of the liquid in the container or they may be arranged to measure the mass of the liquid. In either case the electrodes of a capacitor are suitably arranged in the liquid container so that the capacitance between them changes in proportion to the extent of immersion and this capacitor will be termed hereinafter the measuring capacitor.

It will be appreciated that a capacitance type liquid gauge will require a source of alternating current for operation and that the indication given by the gauge may be affected by variation in voltage or frequency of this source.

It is an object of the present invention to provide a capacitance type liquid quantity gauge which shall give a correct indication of liquid quantity notwithstanding changes in voltage or frequency of the supply of alternating current provided for the operation of the gauge.

A further object of the present invention is to provide a capacitance type liquid quantity gauge that is fully compensated against variation in temperature over the working range.

A still further object of the invention is to provide means for compensating for the effect of changes in liquid temperature on the accuracy of indication of a capacitance type liquid quantity gauge.

Another object of the invention is to provide a measuring capacitor for a capacitor type liquid quantity gauge which includes a temperature-sensitive resistor arranged in good thermal contact with the liquid.

Another object of this invention is to provide a voltage stabilizing device which is capable of providing constant output voltage notwithstanding variation of applied voltage.

Figure 1:
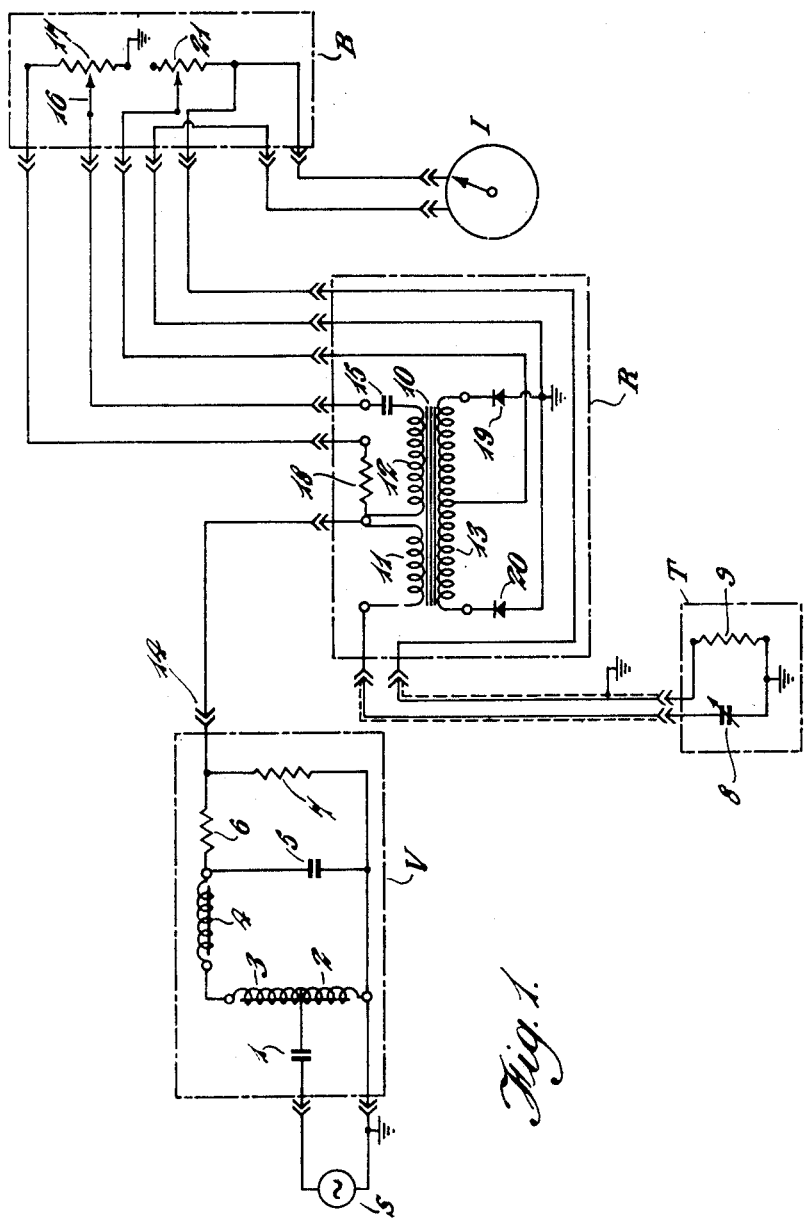
Figure 2:
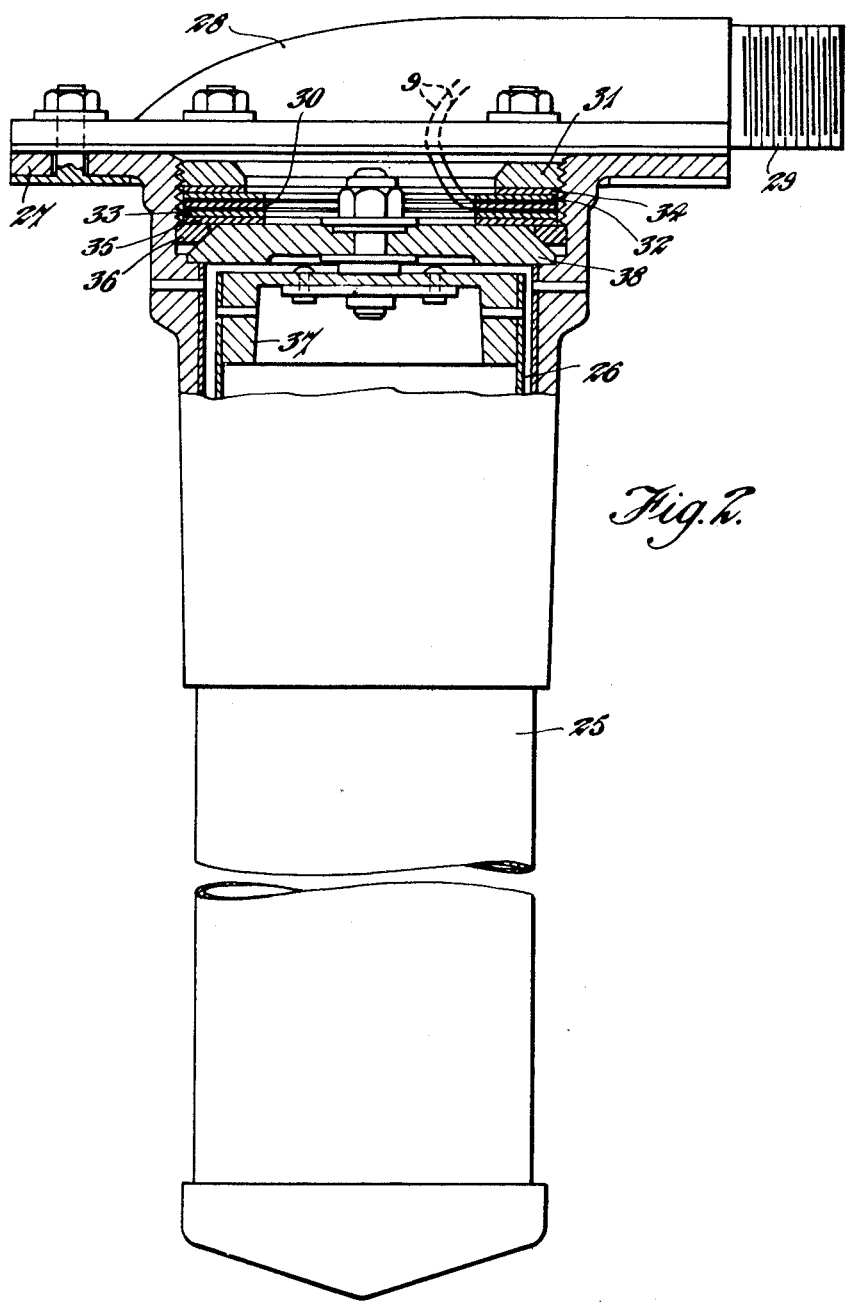

Other objects of the invention and the advantages thereof will become apparent during the course of the following description of a capacitance type fuel quantity gauge for aircraft in accordance with the invention which is shown in the accompanying drawings in which Figure 1 is a wiring diagram of the gauge, and Figure 2 is a side view, partly cut away and partly in section, of a measuring capacitor having a temperature-compensating resistance embodied therein.

Referring to Figure 1 the gauge comprises essentially a voltage stabilizing unit V, a rectifier unit R, an adjustment box B, a tank unit T and an indicator I, the several parts being connected by cables as indicated so that they can be disposed in the aircraft as required.

Alternating current is supplied from a source S and although on aircraft the nominal voltage and frequency may be 115 volts and 400 C. P. S. these may vary between say 90–120 volts and 360–440 C. P. S. Since the system is not in itself inherently independent of voltage or frequency variations, the indication of fuel quantity being approximately directly proportional to both voltage and frequency, the stabilizing unit is designed to provide compensation for variation in both voltage and frequency of the source so that the indication is substantially unaffected thereby.

To this end and in order to stabilize the source as regards voltage variations, the stabilizing unit V comprises a capacitor 1 and an inductor 2 connected in series with the source S. The inductor is wound on a closed core of high permeability material and the current flowing through the circuit at the minimum value of the voltage of the source S is such as to produce a flux density in the core sufficient to saturate the material magnetically. After the saturated condition is reached a further increase in voltage of the source reduces the reactance of the inductor 2 and the voltage divides vectorially between the capacitor 1 and the inductor 2 in such manner as to maintain constant voltage across the inductor 2 at a given frequency.

Since in general the operating voltage required for the apparatus is somewhat higher than that obtainable from the source S, the inductor 2 is arranged to form part of an auto-transformer comprising the inductors 2 and 3. Equivalently the inductor 3 could be arranged as a separate winding on the core of inductor 2 if it were desired to isolate the gauge circuit from the source. With suitable design such an arrangement may operate to give a substantially constant voltage output which varies by not more than one half of one percent for applied voltages varying over a range of from 50–150 volts.

Due to variation of the permeability of the core material of the inductor 2 and the semi-resonant nature of the input circuit comprising inductor 2 and capacitor 1, the output voltage of the arrangement will not remain constant if the frequency varies but will vary in the same sense and in the ratio of approximately 1.5 to 1. Correction for this change in voltage may be provided by using a frequency discriminating network having a characteristic which is the inverse of the transformer frequency characteristic. A suitable network may comprising an inductor in series and a capacitor in shunt with the load.

As will be explained hereinafter, in the present application it is required that the stabilizing unit V provide an output voltage which falls as the input frequency rises and the stabilizing unit therefore includes a frequency discriminating network comprising an inductor 4, a capacitor 5, and a resistor 6 having the required characteristics. This discriminating network also has the advantage that it greatly attenuates the harmonics which are produced by the operation of the core of inductor 2 in the saturated condition and the final output of the stabilizing unit is therefore almost sinusoidal.

The tank unit T comprises a capacitor 8 which is adapted to be arranged in a fuel tank and which varies in capacitance when immersed in a liquid fuel such as gasoline. The stabilizing unit also comprises a compensating resistor 7 the purpose of which will be explained hereafter.

Basically the measuring system merely indicates the current flowing through the measuring capacitor 8, which current at constant voltage will be proportional to capacitance, and, therefore, according to the arrangement of the capacitor in the fuel tank, representative of the quantity of fuel in the tank. The reactance of the measuring capacitor 8 is, of course, proportional to frequency so that should the frequency of the supply S change the current through the capacitor 8 will change in porportion. The stabilizing unit V is therefore provided with the frequency discriminating network comprising inductor 4, capacitor 5 and resistor 6 as previously described so that if the frequency changes the voltage output of the stabilizing unit will also change in opposite sense thereby to offset the change in reactance of the measuring capacitor 8.

As the amount of power available in the system with any reasonable value of applied voltage and of capacitance is very limited it is not practicable to measure this current directly and accordingly it is preferred to use a direct current moving coil instrument as the indicator of fuel quantity and to provide rectifiers and a transformer to match the impedance of the instrument to that of the A. C. system. Additionally since the capacitance of the measuring capacitor 8 is not zero when the fuel tank is empty but approximately half the capacitance obtaining when the capacitor is completely submerged it is desirable to balance out this initial capacitance so that the indicator readings may start from zero.

The rectifier unit R accordingly comprises a step-down transformer 10 which is provided with two primary windings 11 and 12 and a centre-tapped secondary winding 13. The winding 11 is connected in series with the measuring capacitor 8 between the high voltage terminal 14 of the stabilizing unit V and ground while the winding 12 is connected between the high voltage terminal 14 and ground in series with fixed capacitor 15 and an adjustable portion 16 of potential divider 17 which is connected in series with resistor 18 between the terminal 14 and ground.

By adjustment of potential divider 17 the currents in the two windings 11 and 12 may be made to balance, for example, when the capacitance of the measuring capacitor 8 is at minimum value, so that there will then be no output from the secondary winding 13 of the transformer 10. The direct current supply to the indicating instrument I is obtained by connecting the secondary winding 13 of the transformer 10 in a full wave rectifying circuit with the rectifiers 19 and 20, which may conveniently be germanium crystal diodes, the indicating instrument I being connected in series with a rheostat 21 between the centre tap of winding 13 and ground.

The potential divider 17 and rheostat 21 are housed separately in the adjustment box B which is arranged at some accessible point in the system. This arrangement is provided in order to ensure that a completed system may be adjusted to give correct indications despite variations in individual components. As already indicated adjustment of the potential divider 17 enables the indicator I to be made to read zero when the fuel tank is empty. Adjustment of the rheostat 21 alters the sensitivity of the indicator I so that a correct "full" indication may be obtained despite variation in individual components and also to allow for fuels of differing dielectric constant. It will be appreciated that the latter adjustment must be made after the zero reading has first been corrected.

The relation between indication and the change of capacitance of the measuring capacitor 8 may be made quite linear by suitable design except near the zero position when the linearity is affected by the change of resistance of the rectifiers 19 and 20.

In most systems however it is desirable to have an off-scale condition when the system is not energised; mechanical suppression of the zero of the instrument can therefore be employed so that the condition at zero reading is not in fact that of electrical balance but is displaced therefrom somewhat so that the rectifiers will be operating remote from their threshold condition and the linear condition will hold good down to zero scale reading. Alternatively balance may be obtained on the D. C. side so that the rectifiers always operate with quite high currents, for example by providing two secondary windings on the transformer 10 and two sets of rectifiers in a bridge circuit.

In the system thus far described the operation will be substantially unaffected by changes in the supply voltage and frequency and an indication proportional to change in capacitance of the measuring capacitor 8 will be obtained.

Equipment for use in aircraft is however subjected to a very wide range in ambient temperatures, e. g. from −50° C. to +70° C., and precautions have to be taken to ensure that such temperature changes do not affect the accuracy of indication. In general the resistance of all windings will tend to increase with temperature while the permeability of magnetic circuits will decrease. Both these effects combine to reduce the overall output of the stabilizing unit V with rise in temperature. It is possible to provide overall compensation for this effect by connecting a resistance having a negative temperature coefficient in series with the indicator I, or equivalently by connecting a resistance having a positive temperature coefficient in shunt with the indicator. However since the various components may be situated in different position on the aircraft where they are subjected to different ranges of ambient temperature it is preferred to compensate each part of the equipment separately. In the stabilizing unit the output voltage changes by some 10–15% over the required temperature range and compensation for this is provided by using as the resistor 7 a semi-conductor having a negative temperature coefficient. Such devices are however not linear with temperature and in practice it is preferred to make resistor 7 in part of material of negative temperature coefficient and in part of a resistance having a positive temperature coefficient.

The transformer 10 does not require compensation but the crystal diodes 19 and 20 have a large negative temperature coefficient which may be applied to compensate for the positive temperature coefficient of the indicator I. Preferably the diodes are mounted inside the indicator casing to assist in such compensation. By suitable adjustment in this manner an overall temperature compensation to within 1% may be obtained over the required temperature range.

There remains however one further temperature effect that requires compensation. In all previous forms of capacitance type gauges it has been assumed that the expression $$K - \frac{1}{D}$$

remains constant over the working temperature range and that when the gauge is calibrated in terms of mass of fuel this constancy provides compensation which makes the gauge reading independent of temperature changes of the fuel. Such compensation is however not complete and there remains a residual error which is approximately linear with temperature and has a magnitude of some 2% negative at −50° C. and 2% positive at +70° C. This overall error of 4% is twice the allowable tolerance for overall accuracy which is at present permissible and compensation must therefore be provided. As the error is proportional to fuel quantity and therefore to gauge reading it is readily possible to compensate the present system by providing a temperature sensitive resistor in thermal contact with the fuel and arranged to control the sensitivity of the indicator. Since the correction required will be a constant percentage of full scale reading a negative temperature coefficient resistor may be connected in series with the instrument or a positive temperature coefficient resistor may be connected in shunt with the instrument, in either case of such value that the full scale reading will be reduced by 4% when the resistor is subjected to the temperature range above specified.

In the system shown in Figure 1 a positive temperature coefficient resistor 9 is arranged in the tank unit T in good thermal contact with the fuel and is connected electrically in shunt with the indicator I. The resistor 9 may be arranged to be immersed in the fuel but in practice it is more convenient to arrange that it is in good thermal contact with the electrodes of the measuring capacitor 8 which themselves are formed of material of good thermal conductivity so that they will be at the temperature of the fuel.

In one form of the measuring capacitor, which is shown in Figure 2, the electrodes comprise concentric tubes 25 and 26 of aluminium of which the outer tube 25 is secured to a mounting flange 27 with which the capacitor may be mounted on the tank wall and grounded and the inner tube 26 is secured in spaced relation to the outer tube 25 and insulated therefrom, the inner tube at the top thereof being secured in the desired spaced relationship to the outer tube by means of a retainer 37 secured within the top of the inner tube 26 and bolted to a mounting member 38 housed within the cylindrical recess in mounting flange 27. A cap 28 mounted on the flange 27 is provided with a receptacle 29 for a twin co-axial cable with which one electrode, the inner tube 26, of the capacitor and one end of the resistors 9 may be connected to the rectifier unit R (Figure 1).

The resistor 9 is wound on an insulating former 30 in the form of a toroid of nickel or other suitable wire having a positive temperature coefficient and the former 30 is clamped within the recess in the supporting flange 27, by the clamping ring 31, between mica washers 32 and 33 and brass washers 34 and 35, a sealing ring 36 of rubber or other suitable material being interposed between the lower brass washer 35 and mounting member 38. So arranged the resistor 9 is in good thermal contact with the flange 27 and outer electrode 25 and therefore with the fuel, but is electrically insulated from the flange. Alternatively the resistor may be clamped similarly between the flange 27 and the tank wall.

The gauge of the present invention has many advantages over those previously proposed. In particular it required no vacuum tubes and the life of the components used is virtually unlimited. Since no provision need be made for tube replacement the construction, placing and protection of the units can be much simplified. The indicating device is a simple milliameter of robust construction and instruments of varying design may be used interchangeably provided their resistances are approximately the same. The characteristics of the voltage stabilizer are such that in the event of a short circuit in the system the input current will fall and the device will not burn out. Moreover owing to the high impedance and poor regulation of the input transformer there will be very little dissipation of energy should the measuring capacitor be short circuited and the risk of explosion is correspondingly reduced. The power consumption of the system is also very low. The design of the transformer in the rectifier unit may be such as to enable a wide range of tank unit capacitance to be accommodated and as it is not directly dependent upon capacitance ratio high stray capacitance in the connecting cables can be tolerated.

A further and important feature is that owing to the very low operating frequency there is no radio frequency radiation and elaborate shielding is not required.

I claim:

1. A measuring capacitor for a capacitor type liquid quantity gauge comprising two elongated spaced electrodes, means for suspending said electrodes in the liquid to be measured, including a recessed thermally conductive body having a peripheral flange, and a temperature compensating resistor arranged in said recess in good thermal contact with, but electrically insulated from said body.

2. A measuring capacitor as claimed in claim 1, in which said temperature compensating resistor is a toroidal winding of temperature sensitive material on a ring of insulating material.

3. A measuring capacitor as claimed in claim 1, in which said temperature compensating resistor is a toroidal winding of temperature sensitive material wound on a ring of insulating material and clamped on said flange between rings of electrical insulating material.

STANLEY JAMES SMITH.

REFERENCES CITED

The following references are of record in the file of this patent:

UNITED STATES PATENTS

| Number | Name | Date |
|---|---|---|
| 2,188,628 | Freystedt | Jan. 30, 1940 |
| 2,221,456 | Pohm et al. | Nov. 12, 1940 |
| 2,300,562 | Freystedt | Nov. 3, 1942 |
| 2,409,073 | Sias et al. | Oct. 8, 1946 |
| 2,428,898 | Waymouth | Oct. 14, 1947 |
| 2,444,794 | Uttal et al. | July 6, 1948 |
| 2,456,617 | Burch | Dec. 21, 1948 |
| 2,482,522 | Tubbs | Sept. 20, 1949 |
| 2,540,658 | DeGiers et al. | Feb. 6, 1951 |